United States Patent [19]

Khandelwal

[11] Patent Number: 5,047,119

[45] Date of Patent: Sep. 10, 1991

[54] METHOD OF STABILIZING WHITE LIQUOR FLOW IN THE CAUSTICIZING OF GREEN LIQUOR FROM A KRAFT PAPER PLANT

[75] Inventor: Bimal K. Khandelwal, Pensacola, Fla.

[73] Assignee: Champion International Corporation, Stamford, Conn.

[21] Appl. No.: 406,278

[22] Filed: Sep. 11, 1989

[51] Int. Cl.[5] ............................................. D21C 11/04
[52] U.S. Cl. .................................. 162/30.11; 162/49; 423/165; 423/183; 423/432; 423/641
[58] Field of Search ................... 162/30.1, 29, 30.11, 162/49, DIG. 10; 423/165, 183, 432, 641; 210/928

[56] References Cited

U.S. PATENT DOCUMENTS

| | | | |
|---|---|---|---|
| 4,131,508 | 12/1978 | Laakso | 162/30.11 |
| 4,236,960 | 12/1980 | Hultman et al. | 162/30.11 |
| 4,668,342 | 5/1987 | Blackwell | 162/30.11 |

Primary Examiner—Peter Chin
Attorney, Agent, or Firm—Evelyn M. Sommer

[57] ABSTRACT

An improved method for causticizing the green liquor formed in a kraft paper plant by contacting the green liquor with lime to thereby form white liquor followed by clarifying the white liquor by removing the lime mud therefrom in a clarifier is disclosed wherein the improvement lies in removing the lime mud from the clarifier at a predetermined rate.

3 Claims, 1 Drawing Sheet

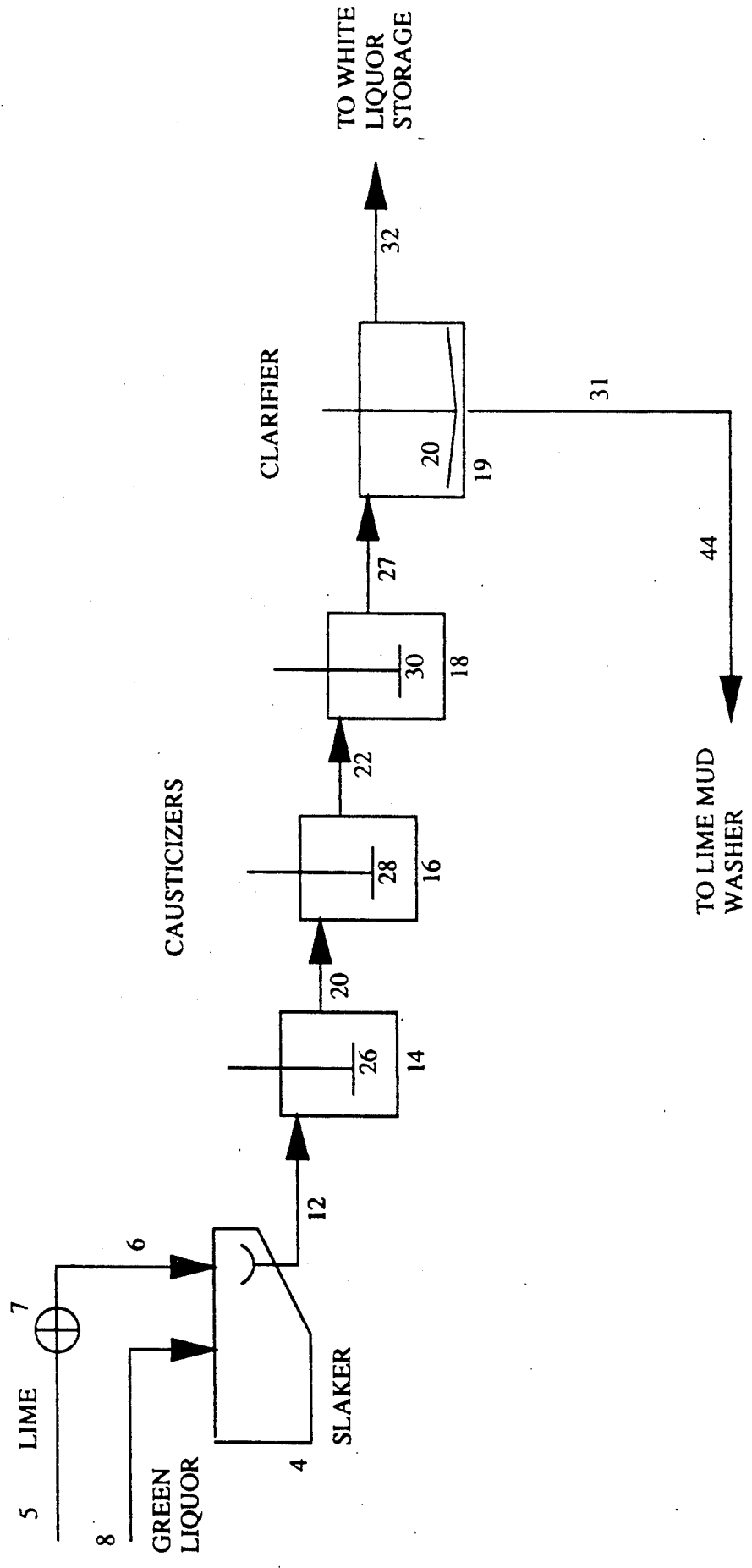

METHOD OF STABILIZING WHITE LIQUOR FLOW IN THE CAUSTICIZING OF GREEN LIQUOR FROM A KRAFT PAPER PLANT

BACKGROUND OF THE INVENTION

This present invention is concerned with an improved process for converting the green liquor stream from a kraft paper plant to white liquor.

The kraft process is based on the pulping or digesting of wood chips in a strongly alkaline liquor. This liquor is called white liquor. It is a fluid consisting mainly of NaOH and $Na_2S$. The pulping operation consumes the NaOH whereas the $Na_2S$ content remains substantially constant.

The spent liquor from the digesters plus the filtrate from the washing operation is commonly known as black liquor and contains substantially all the alkali originally added and other wood and wood derived residues from the pulping operation. The black liquor is sent to an alkali recovery plant where it is evaporated and the concentrate then burned. The residue from the combustion process includes $Na_2S$ and $Na_2CO_3$. This residue is dissolved with water to form green liquor. The green liquor will contain, in varying amounts, a high content of sodium carbonate and a minor amount of NaOH. Lime is added to boiling green liquor to form white liquor according to the following reactions:

Slaking reaction

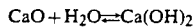

$$CaO + H_2O \rightleftharpoons Ca(OH)_2$$

Causticizing reaction

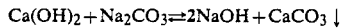

$$Ca(OH)_2 + Na_2CO_3 \rightleftharpoons 2NaOH + CaCO_3 \downarrow$$

The process does not affect the absolute amount of $Na_2S$ in the green liquor because $Na_2S$ does not react in the slaking or causticizing process. The $CaCO_3$ by-product mixture formed is known as lime mud or sludge and it is separated off and CaO (lime) is then regenerated in a lime kiln for reuse in the further conversion of green liquor to white liquor.

The concentration or amount of $Na_2CO_3$ in the green liquor is the basis for determining how much lime is introduced into the causticizing plant. The heterogeneous nature of the regenerated lime particles and green liquor makes it difficult to precisely control the lime flow so that there will not be variations in causticizing efficiency. These variations also affect the lime mud settling rate in the white liquor clarifier where the white liquor is clarified by separating out the lime mud present.

The settled out mud is removed from the white liquor clarifier for further processing. An online density controller regulates the density (solids concentration) of the lime mud by adjusting the mud flow rate from the clarifier. If the lime mud density is high, the flow from the clarifier is increased to pump out the lime mud until the density of the lime mud is lowered. In the alternative, the density of the lime mud may be raised by decreasing the flow rate.

A torque measurement on the rake mechanism can override this control method. If the torque rises above the target level, the density controller is overridden and additional lime mud is pumped out to bring the torque to a level which will not cause equipment damage and process interruption.

The variation in the lime settling rate and the torque control mechanism used to compensate for such variation can result in widely different flow rates. For example, in a commercial plant these rates have been known to vary from about 150 liters per minute to about 500 liters per minute within 3 to 4 hours.

This cycle may be repeated 6 or 7 times during a day. As a given amount of wash water is introduced counter currently to wash the mud, fluctuations in the mud flow rate would affect the mud washing efficiency, clarity of the wash and the efficiency of the lime kiln operation.

Accordingly, it is a primary object of the invention to provide an improved method for the regeneration of white liquor from green liquor of a kraft paper plant stream.

It is also an object of this invention to provide an improved method of controlling the variations in the operation of the clarifier in the lime mud separation step in the production of white liquor in a kraft paper plant stream by using a controlled rate of lime mud removal.

These and other objects of the invention will become apparent from the text of the specification and the appended claim.

SUMMARY OF THE INVENTION

The invention provides an improved method for causticizing the green liquor of a kraft paper plant by contacting the green liquor with lime to form white liquor, the improvement comprising removing the lime mud at a predetermined rate.

BRIEF DESCRIPTION OF THE DRAWING

FIG. 1 is a schematic of the various apparatus components and piping which may be utilized to convert green liquor to white liquor according to the present invention.

DETAILED DESCRIPTION OF THE INVENTION

The process of the invention may be practiced in any suitable apparatus which is typically utilized in the conversion of green liquor from a kraft paper mill stream to white liquor. An example of an apparatus which may be employed is set forth in FIG. 1. As shown in FIG. 1, green liquor is fed to slaker 4 through line 8. A stoichiometric amount of lime is fed through line 5 to take-off line 6 at valve 7. Take-off line 6 is connected to slaker 4. The stoichiometric amount of lime is calculated after analysis of the amount of $Na_2CO_3$ in the green liquor using conventional analytical techniques or automated sensor systems which are well known to those who are skilled in the art. The lime is allowed to react with the amount of $Na_2CO_3$ present in the green liquor to produce calcium hydroxide. The mixture from slaker 4 is fed through line 12 to a series of discrete causticizers 14, 16 and 18 which are provided with interconnecting lines 20 and 22 and agitators 26, 28 and 30. A number of discrete causticizer vessels are normally used to reduce risk of lime particles migrating directly out of the system without undergoing reaction. The causticizers are provided with agitators, for instance mechanical stirrers in order to mix the reactants i.e., $Na_2CO_3 + Ca(OH)_2$ and maintain them in a state of uniform solution. The residence time in the causticizers is, for sake of example, on the order of an hour and a half to two. The effluent from the last causticizer 18 is fed to a solids liquid separator e.g. clarifier 19 through line 27. In the clarifier the mixture is separated by gravity into a liquid phase consisting of clear white liquor which is strong in NaOH and which is used in the pulping process and a phase heavy in solids, mainly $CaCO_3$ which is later washed with water to reduce its white liquor content and then passed to a lime kiln where the solids are calcined to yield fresh CaO. The lime mud is withdrawn from the bottom of clarifier 19 through line 31 at a constant predetermined rate. The rate is determined by determination of the amount of calcium carbonate and the determination of the amount of calcium hydroxide in the lime feed. The control means for adjusting the rate at which the lime mud is withdrawn comprise a flow meter and a control valve. The flow meter controls the flow to a given set point arrived at by manipulating the control valve.

Clarifier 19 is provided with a rake mechanism 20 which is agitated by motor means (not shown) that is provided with conventional torque detecting means (not shown). The torque detecting means comprise a pressure transmitter which measures the pressure on the rotating arms of the rake mechanism.

The lime mud is withdrawn through line 31 and passed to the lime mud washer (not shown) through line 44 prior to being passed to the lime kiln.

The rate of lime mud withdrawal through line 31 is fixed according to green liquor flow with a clamp of $\mp 10\%$ or preferably about $\mp 6\%$ to provide for fluctuation in green liquor or lime quality. The quality of the green liquor is monitored by an automatic density controller and also by bi-hourly manual testing. The quality of the lime is also monitored by manual testing. A control system such as the Videospec system manufactured by Foxboro is used to integrate the data concerning the green liquor and the lime to provide the information necessary to enable the controller for the lime mud flow rate to adjust the lime mud flow within the predetermined limits. The torque controller on the rake in the clarifier is included to override the preset limit in lime mud flow to insure that the process stream will not be interrupted and to protect the motor driving the rake.

The following example will serve to illustrate the invention.

EXAMPLE

In an actual operating plant comprising a 750 TPD market pulp mill, the process of the invention is carried out using the conventional apparatus constituting a causticizing plant constructed in accordance with the invention.

The following operating conditions were used in the instant example:

| Green Liquor Analysis | Lime Analysis | Lime Mud Density | Green Liquor Flow | Lime Mud Flow Rate | Torque |
|---|---|---|---|---|---|
| 110-115 GPL as $Na_2O$ | 92-93% as CaO | 1.4-1.5 | 600 gpm | 100-110 gpm | 39-41% |

COMPARATIVE EXAMPLE

The following operating conditions were followed in the apparatus of the type described in the drawing but utilizing the conventional unmodified apparatus and method.

| Green Liquor Analysis | Lime Analysis | Lime Mud Density | Green Liquor Flow | Lime Mud Flow Rate | Torque |
|---|---|---|---|---|---|
| 110-115 GPL as $Na_2O$ | 92-93% as CaO | 1.2-1.5 | 600 gpm | 40-150 gpm | 35-45% |

The Example carried out in accordance with the invention shows that the mud flow rate, mud density and the torque are all maintained at uniform rates and almost no fluctuation is seen as compared with the results for the Comparative Example.

I claim:

1. In a method for causticizing a green liquor stream from a kraft paper plant by contacting said green liquor with lime to form white liquor and clarifying said white liquor by removal of lime mud in a clarifier, the improvement which comprises removing the lime mud from said clarifier at a set point flow rate based on the green liquor flow rate of the paper plant; measuring fluctuations in the amount of sodium carbonate in the green liquor and fluctuations in the amount of calcium hydroxide in the lime feed; adjusting the lime mud flow rate by up to $\mp 10\%$ from the set point in accordance with the amount of sodium carbonate in the green liquor and the amount of calcium hydroxide in the lime feed for achieving a substantially uniform lime mud density, whereby variations in the operation of the clarifier and variations in the lime mud flow rate both are controlled.

2. The method of claim 1 wherein the lime mud flow rate varies $\mp 6\%$ based on the fixed mud flow set point.

3. The method of claim 1 wherein the clarifier includes rake means for movement in the clarifier relative to the lime mud; motor means for moving the rake means in the clarifier; and torque measuring means for measuring pressure on the rake means; said method further comprising the steps of comparing the torque measured by said torque measuring means to a predetermined torque amount and increasing the flow rate of lime mud by more than 10% in response to an increase in torque beyond the predetermined amount for protecting the motor means of the clarifier.

* * * * *